UNITED STATES PATENT OFFICE.

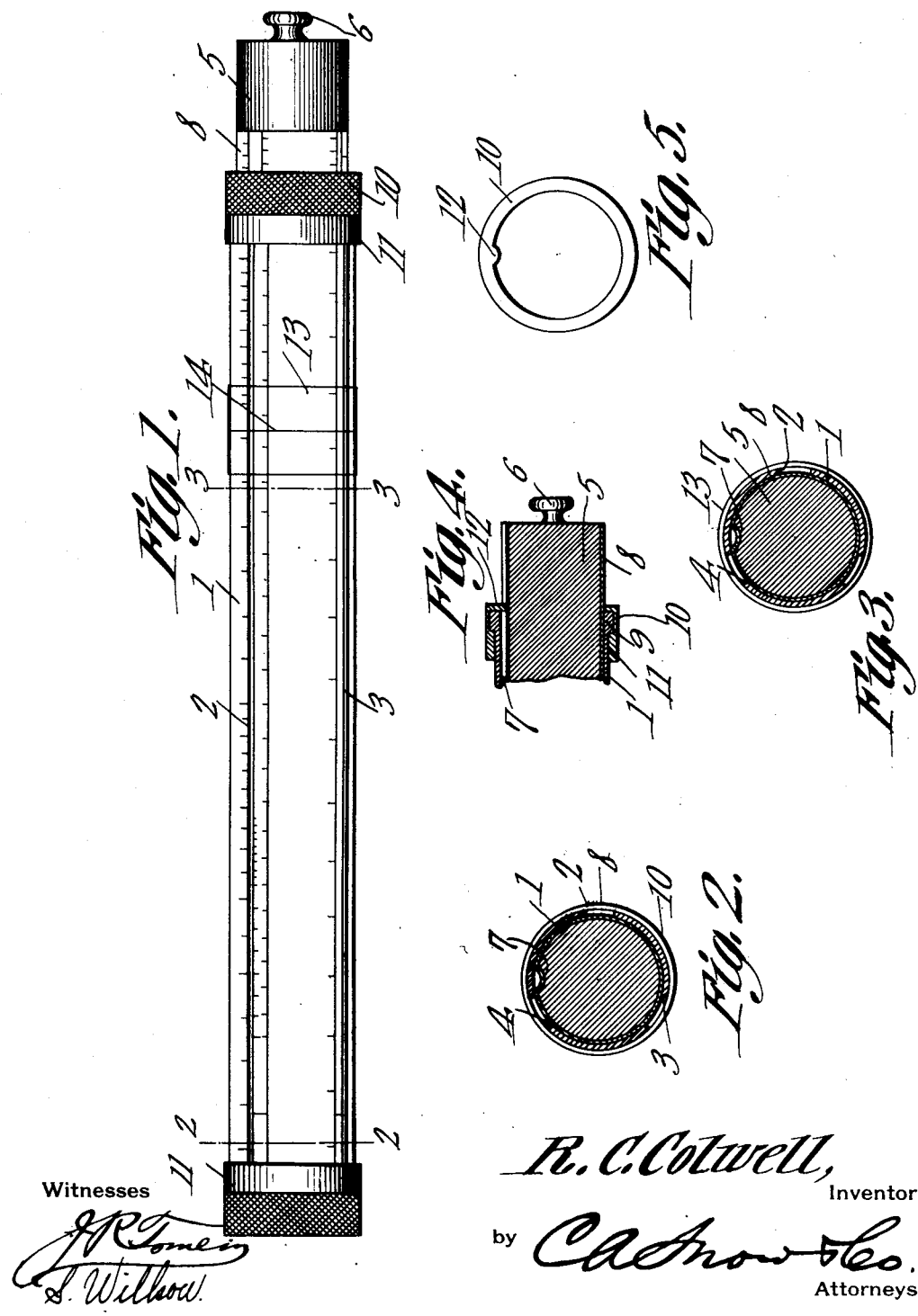

ROBERT CAMERON COLWELL, OF BEAVER FALLS, PENNSYLVANIA.

SLIDE-RULE.

1,080,811.  Specification of Letters Patent.  Patented Dec. 9, 1913.

Application filed February 7, 1913. Serial No. 746,871.

*To all whom it may concern:*

Be it known that I, ROBERT C. COLWELL, a subject of King of England, residing at Beaver Falls, in the county of Beaver and State of Pennsylvania, have invented a new and useful Slide-Rule, of which the following is a specification.

The present invention relates to improvements in slide rules, the primary object of the present invention being the provision of a slide rule composed of an outer hollow cylindrical member in which is slidably and rotatably mounted a cylindrical member, the outer member constituting a casing and being provided with a plurality of scaled slots, which are disposed in correlation with a plurality of scales placed upon the inner telescopic member, whereby the various results to which a slide rule is subjected may be accomplished, there being disposed for sliding movement upon the outer member, a cursor, which is disposed to correlate simultaneously with all of the scale slots of the outer member and to be disposed in correlation with the selected scales of the inner member.

A further object of the present invention is the provision of means whereby the inner telescopic member may be locked against rotary or against sliding movement, as may be desired.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is an elevation of the complete rule. Fig. 2 is a section taken on line 2—2 of Fig. 1. Fig. 3 is a section taken on line 3—3 of Fig. 1. Fig 4 is an enlarged detail sectional view showing the means for locking the inner member against rotation or against sliding movement as may be desired. Fig. 5 is a detail end view of such means *per se*.

Referring to the drawings, the numeral 1 designates an outer tubular member or casing, which is open at both ends and is provided with a plurality of slots 2, 3 and 4, which have alined along the edges thereof, the scales, as is the usual custom with a slide rule.

Disposed for rotary and longitudinal sliding movement within the tubular member 1, is the cylindrical slide 5, which is provided at its respective ends with the operating handle 6, whereby the same may be manipulated relatively to the incasing member 1 both in a longitudinal or rotary direction and from either open end of the member 1. The slide 5 is provided with one or more longitudinal peripheral grooves, as 7, and disposed exteriorly over the complete surface is the scale carrying sheet 8 of any desired material. This member 5 may be a hollow member or a solid member as indicated without departing from the spirit of the present invention.

In order to provide a means for locking the slide 5 either against rotary movement or longitudinal as may be desired, a bead 9 is formed upon each end of the member 1, to retain the band 10 thereon for rotation, the rim 11 thereof forming the retaining means in conjunction with the rim 9. This band 10 is provided with an internal rim, having a single rounded projection 12 disposed to be placed in registration with the slot 7 so that the slide 5 may be moved longitudinally, or when turned relatively to the slide 5, it will engage the peripheral face of the slide 5, thus producing a cam action to hold the slide 5 frictionally against longitudinal movement but to permit the necessary rotary movement thereof to bring the respective scales into correlation with the scale slots of the member 1 as desired.

Disposed for sliding movement exteriorly of and upon the casing 1 between the cap or band 10, is a transparent ring constituting a cursor 13, provided with the circumferential hair line 14, which is disposed to be alined with any of the respective correlating scales to accomplish the desired result, this slide rule being operated similarly to the usual form of slide rule.

The band 10 and its projection 12, when the projection is out of registration with the longitudinal groove or slot 7 and is in engagement with the circumferential face of the slide 5, has a braking effect to hold the slide 5 against longitudinal sliding movement, the rounded formation of the projection 12, permitting the slide 5 to be rotated more easily than it can be moved longitudinally.

What is claimed is:

1. A slide rule, including a tubular casing having a plurality of longitudinal scales, a cylindrical member rotatably and longitudinally slidable within the casing and provided with a longitudinal recess, said member also being provided with scales for coaction with the scales of the casing, a cursor slidably mounted upon the casing for coaction with the scales of the casing and member, and a band provided with a projection, said band being rotatably mounted on the casing, whereby the projection may be placed into and out of registration with the recess.

2. A slide-rule, including a tubular casing having a plurality of longitudinal scales, a cylindrical member rotatably and longitudinally slidable within the casing, said member being provided with a longitudinal recess and scales for coaction with the scales of the casing, a cursor slidably mounted upon the casing for coaction with the scales of the casing and member, and rotatable means having an inwardly projecting lug and disposed upon the tubular casing and in coactive relation with the cylindrical member for locking the tubular member in selected position.

3. A slide rule, including a tubular casing having a plurality of longitudinal scales, a cylindrical member rotatably and longitudinally slidable within the casing, and member being provided with scales for coaction with the scales of the casing, a cursor slidably mounted upon the casing for coaction with the scales of the casing and the member, a band mounted on the casing for rotary movement concentrically of the cylindrical member, and coöperating means carried by the cylindrical member and band, whereby when said means are alined the cylindrical member is locked against rotation but can be moved longitudinally and when not alined the cylindrical member is held against longitudinal movement but can be rotated.

In testimony that I claim the foregoing as my own, I have hereto affixed my signature in the presence of two witnesses.

ROBERT CAMERON COLWELL.

Witnesses:
 JAMES W. HOSNER,
 HARRY H. LODGE.